March 28, 1950 — R. H. WATSON — 2,502,032
STRAW CUTTER

Filed April 16, 1948 — 2 Sheets-Sheet 1

Inventor
REGINALD HOWARD WATSON
by
Attorney.

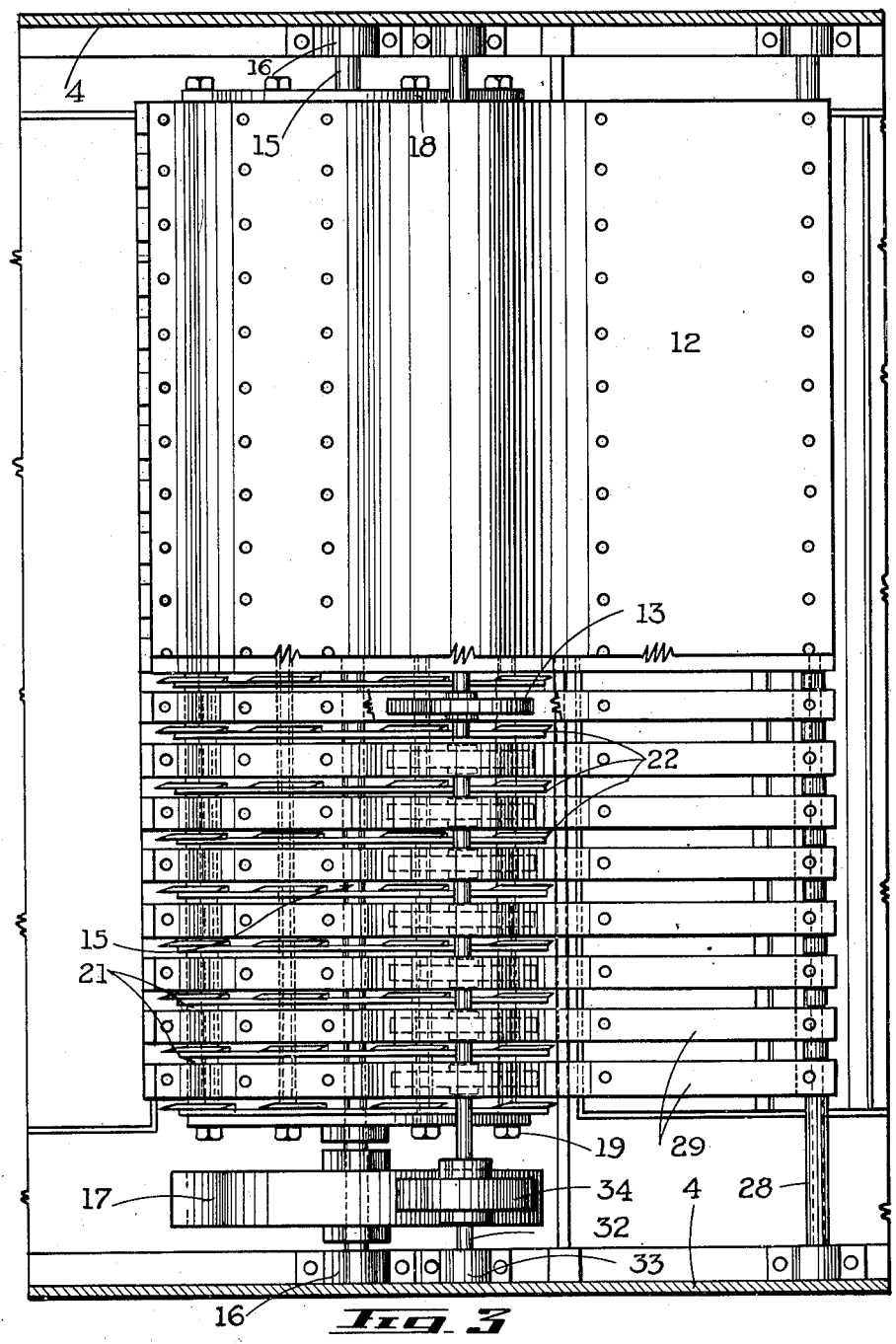

Patented Mar. 28, 1950

2,502,032

UNITED STATES PATENT OFFICE 2,502,032

STRAW CUTTER

Reginald Howard Watson, Mount Forest, Ontario, Canada

Application April 16, 1948, Serial No. 21,461

2 Claims. (Cl. 146—117)

This invention relates to improvements in a straw cutter and appertains particularly to a mechanism for this purpose designed for incorporation in a threshing machine.

An object of the invention is to provide a feed cutter, of novel and improved form, for chopping straw, and embodying also simple and efficient chaff guiding and feeding mechanism.

Another object of the invention is to provide a straw cutter for the rear of a threshing machine and adapted to lie transversely of the thresher between the delivery end of the straw deck and the blower, the cutter consisting of a plurality of rings each with a number of radially extending, circumferentially spaced knives.

Another object of the invention is to provide a revolving cutter of cylindrical form with a series of spaced straw-guiding ribbons between the individual knife rings that make up the cylinder and to which a revolving beater drives the straw, the guide ribbons being arranged in converging pairs and operating to hold the straw against the cutter knives.

A still further object of the invention is the provision of a straw cutter of the nature and for the purpose described that will satisfactorily perform the desired function, delivering the straw from the threshing machine in a uniformly and finely chopped condition so that it may be easily and compactly stored and eliminating the work and expense of subsequent cutting, such cutter being capable of manufacture, installation, operation and servicing at reasonable cost.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

In the drawings:

Figure 3 is a plan of the cutter assembly with parts broken away and others shown in section.

Figure 1:
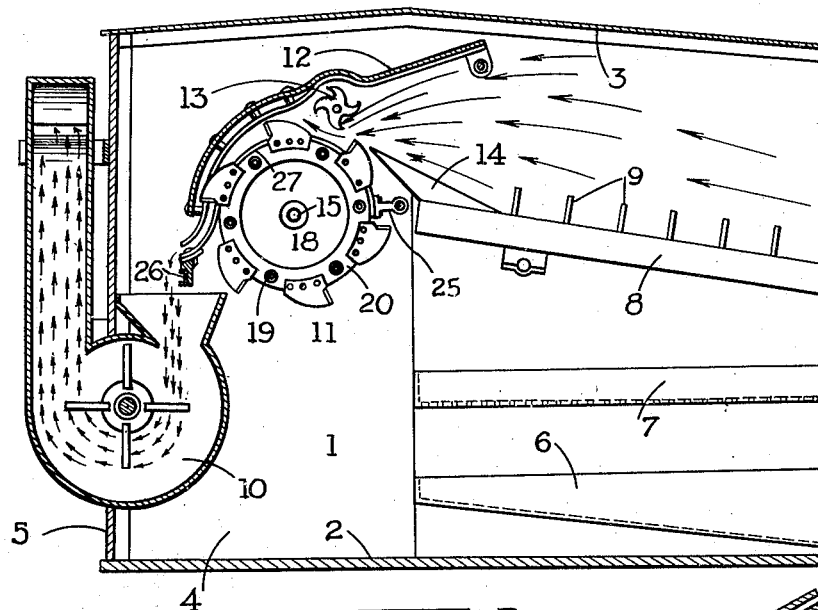
Figure 1 is a longitudinal, vertical section through the rear portion of a conventional threshing machine in which this cutter is installed.
Figure 2:
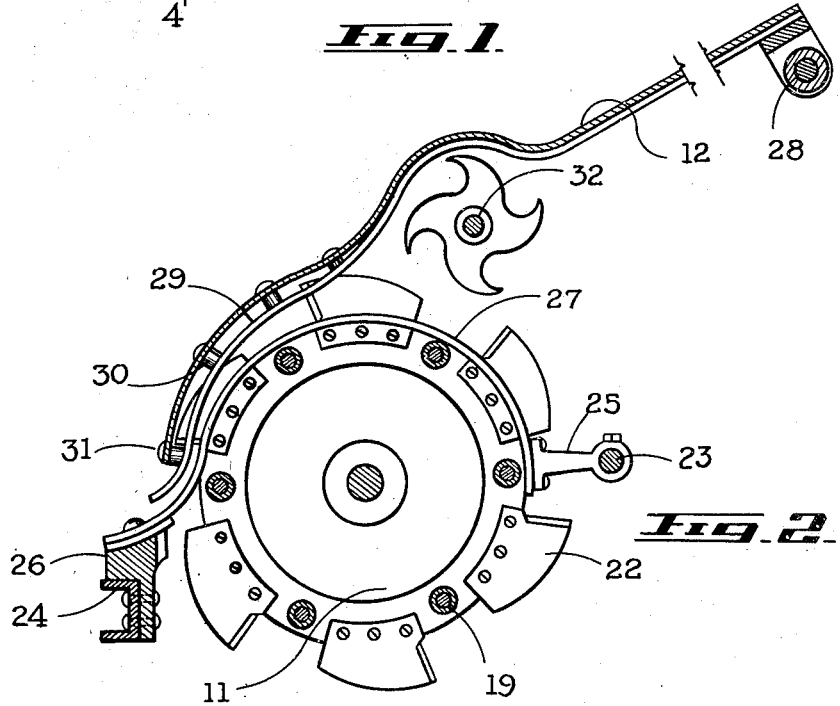
Figure 2 is an enlarged sectional detail of the cutter, straw beater and guide ribbon structure.

In Figure 1 the rear portion of the threshing machine 1 will be seen to include a floor 2, roof 3, side walls 4 and back 5. In superposed relation to the right are the usual grain shoe 6, grain deck or chaffer 7 and straw deck 8, the latter having the regular kicker arms 9 that keep passing the chaff or straw to the blower 10 extending out the rear 5 of the thresher.

I have placed immediately to the rear of the straw deck 8 and above the entrance to the blower 10 a transversely disposed straw cutting cylinder 11, a straw-guiding shield 12 declining from a point above the delivery end of the straw deck 8 to arc over the upper rear sector of the cutter 11 and a revolving beater 13 hooded by said shield and operating above and slightly forwardly of said cutter. A straw-deflecting baffle plate 14 may extend upwards from the straw deck 8 toward the underside of the beater 13 if required by the spacing of these parts.

The instant straw cutter 11 is of generally cylindrical form being rotatable on a transverse shaft 15 journalled on opposite sides 4 of the threshing machine body in bearings 16 and carrying a belt pulley 17 by which the cutting cylinder is driven in a contraclockwise direction. On the shaft 15 near each end a cylinder hub 18 is keyed and between these remote hubs a series of circumferentially spaced elongated rods 19 extend, paralleling and concentric with the shaft 15. A plurality of annular rings 20, bored to accommodate these rods, are arranged therealong in equally spaced relation by interposed rod-carried sleeves 21, while extending radially beyond the periphery of each ring 20 are a number of individual replaceable circumferentially spaced knife blades 22 sharpened on their forward edges.

Across the threshing machine between the straw deck and cutting cylinder, about level with the shaft 15 and beyond reach of the knife blades 22 is a transverse rod 23; and behind the cylinder and just slightly lower than the shaft 15 and likewise beyond reach of the knife blades is a transverse channel bar 24. Along each are mounted respectively fore and aft brackets 25 and 26, equalling the number of spaces between the plurality of knife rings 20 and registering with such spaces. Between each pair of fore and aft brackets 25 and 26 a bowed metal, ribbon-like straw guide 27 extends in an arc over the cutting cylinder substantially level with the periphery of the rings 20 and between which the radially projecting knives sweep.

The upper straw guide shield 12 may be hinged on a transverse rod 28 at a point above the delivery end of the straw deck 8 as mentioned hereinbefore and on its underside support upper straw guide ribbons 29, equalling in number and in respective vertical registry with the several arcuate lower straw guide ribbons 27 that likewise lie between the radially projecting knives 22, the shield 12 being spaced above the free ends of said upper guide ribbons 29 and safely beyond reach of the knife blades by spacer sleeves 30 on the ribbon-and-shield connecting rivets 31.

The beater 13, operating to pack the straw from the straw deck 8 into the converging space between upper and lower guide ribbons 29 and 27 where it is chopped by the knives 22 of the cutting cylinder 11, is mounted on a shaft 32 journalled in bearings 33 on the sides of the threshing machine and has a small drive belt pulley wheel 34 so that the beater turns faster than the knives, and in a reverse or clockwise direction. Here shown the beater is of cruciform design and extending the width of the cutting cylinder but may be divided as the knife rings 20 with separating spacer sleeves on the shaft 32, in which case the upper guide ribbons 29 could lie between the sections of the beater and just over the shaft carried spacer sleeves.

From the foregoing description taken in connection with the accompanying drawings, it will be manifest that a straw cutter is provided that will fulfil all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

Having thus described the invention, what I claim as new and desire to secure by Letters Patent is:

1. For a threshing machine having the usual straw deck and blower; a revolvable straw cutter mounted transversely of the thresher to the rear of the straw deck and above the blower and comprising a plurality of laterally spaced, axially aligned knife rings; a shield hingedly connected above the straw deck at its forward end, declining toward said cutter and arcing thereover to the rear thereof; a plurality of laterally spaced ribbon-like upper straw guides underlying said shield and disposed between the knife rings of said cutter; means connecting said upper straw guides to said shield; and spacing means thereon, whereby the free end of said shield is supported clear of the sweep of the knife rings of said cutter.

2. For a threshing machine having the usual straw deck and blower; a revolvable straw cutter mounted transversely of the thresher to the rear of the straw deck and above the blower and comprising a plurality of laterally spaced, axially aligned knife rings, a shield hingedly connected above the straw deck at its forward end and declining toward said cutter and arcing thereover to the rear thereof, a plurality of laterally spaced ribbon-like upper straw guides underlying said shield and disposed between the knife rings of said cutter, a plurality of fixed lower straw guides of arcuate form extending over the revolvable cutter and within the sweep of the knife rings corresponding in number and lateral spacing with said upper straw guides and a revolvable beater disposed transversely of the machine, underlying the straw shield and above and slightly forward of the cutter.

REGINALD HOWARD WATSON.

REFERENCES CITED

The following references are of record in the file of this patent:

UNITED STATES PATENTS

| Number | Name | Date |
|---|---|---|
| 130,883 | Tyler | Aug. 27, 1872 |
| 593,005 | Wilder | Nov. 2, 1897 |
| 692,601 | Berger | Feb. 4, 1902 |
| 1,221,364 | Neu | Apr. 3, 1917 |
| 1,991,033 | Steinward | Feb. 12, 1935 |

FOREIGN PATENTS

| Number | Country | Date |
|---|---|---|
| 15,201 | Norway | Mar. 21, 1906 |